May 10, 1927.
M. SCHNAIER
MOLD SUPPORT
Filed April 26, 1924
1,628,434
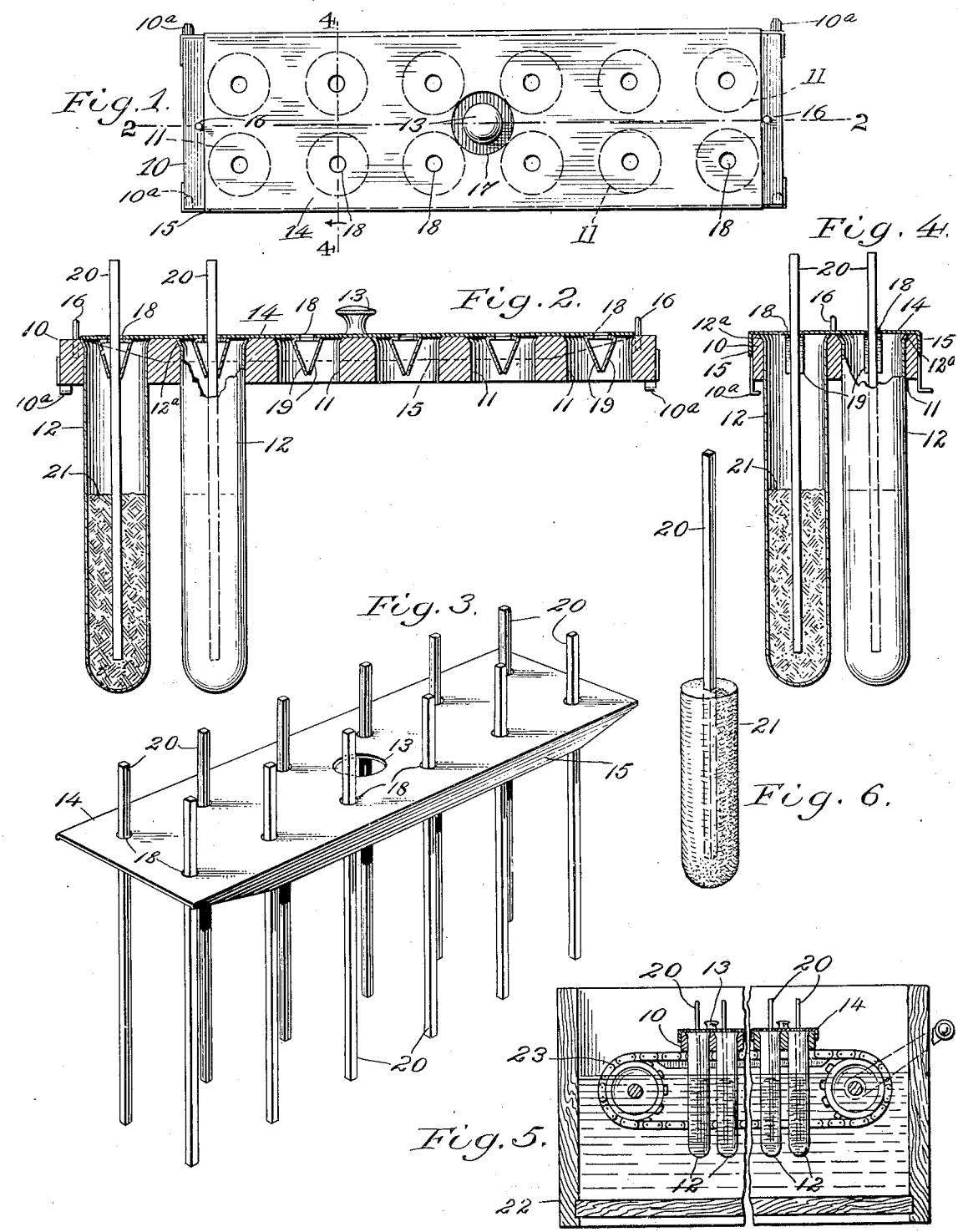

Patented May 10, 1927.

1,628,434

UNITED STATES PATENT OFFICE.

MILTON SCHNAIER, OF NEW YORK, N. Y.

MOLD SUPPORT.

Application filed April 26, 1924. Serial No. 709,178.

My invention relates to improvements in means for supporting molds or containers for producing molded or frozen confections and the like, and the same has for its object more particularly to provide a device for supporting a mold used in the production of a confection mounted upon a stem which latter serves as a handle for said confection.

Further, said invention has for its object to provide a device adapted to receive one or more molds or containers adapted to receive a fluid or semi-fluid composition which is to be converted into a solidified confection having embedded therein a stem to serve as a handle therefor.

Further, said invention has for its object to provide a device comprising essentially a frame or holder adapted to receive a plurality of molds or containers in such manner that the same will not be displaced by flotation or otherwise from said support when said molds or containers are immersed in a liquid bath or fluid in order to convert the contents of said molds or containers into the desired condition or form.

Further, said invention has for its object to provide a device adapted to receive and hold firmly in position therein a plurality of molds or containers filled or partly filled with a fluid composition, and to hold properly positioned within each of said molds or containers a stem which, when said liquid composition is solidified, will serve as a handle therefor.

Further, said invention has for its object to provide a device in which the means for holding the molds or containers in position within their support, and for holding the stems centrally in position severally within said molds and the fluid composition therein, may be readily applied to or removed from said support.

Other objects will in part be obvious and in part be pointed out hereinafter.

To the attainment of the aforesaid objects and ends, my invention consists in the novel details of construction, and in the combination, connection and arrangement of parts hereinafter more fully described and then pointed out in the claims.

In the accompanying drawings forming part of this specification,

Figure 1 is a plan or top view showing one form of device constructed according to, and embodying my said invention;

Fig. 2 is a longitudinal section thereof, on line 2—2 of Fig. 1;

Fig. 3 is a perspective view showing the detachable top member or cover plate of the device with the stems in position therein ready to be attached to a mold support or frame;

Fig. 4 is a transverse section on the line 4—4 of Fig. 1, looking in the direction of the arrow;

Fig. 5 is a diagrammatic view showing several filled mold supports or frames in position within a freezing bath, and Fig. 6 is a detail perspective view showing a completed product.

In said drawings the device is illustrated as comprising a support or frame 10 which is rectangular in form, and made of any suitable material and provided with apertures 11 for the reception of the molds 12. By preference the frame 10 is provided with two parallel rows of apertures 11, and the confection molds 12 are of cylindrical form, closed at their lower ends, and provided at their upper ends with annular flanged portions 12$^a$, which serve to support the molds duly in position with the frame 10. The molds or containers may be made of any suitable material, and in any convenient form, for convenience, and to insure cleanliness, ordinary glass test tubes of appropriate size and diameter may be employed.

At the center of the frame 10 is arranged a small knob or finger portion 13 to facilitate the handling of the frame and its contents.

14 denotes a cover plate, which also serves as the stem positioning and retaining means. The said cover plate 14 is preferably formed of sheet metal, and provided at its opposite longitudinal edges with depending flanges 15 adapted to engage frictionally with the longitudinal edges of the frame 10 in order to hold said cover plate 14 attached thereto and against transverse movement thereon. In order to hold said cover plate 14 against longitudinal movement upon said frame 10 the latter may be provided, adjacent to its opposite ends, with suitable stops or pins 16.

The cover plate is provided with one large central opening 17 to accommodate the knob 13 of the frame 10, and adjacent to each longitudinal edge said cover plate is provided with a row of smaller apertures 18 which correspond with the number of mold apertures 11 in the frame 10, and upon the underside of said cover plate 14, adjacent to the opposite sides of each aperture 18, are provided a pair of downwardly extending, flat spring fingers 19, 19, each pair of which is adapted to hold between the same a stem 20 to maintain the same duly centered within its respective mold or container 12 with its lower portion extending into the liquid composition therein.

The support or frame 10 is provided upon its under side at the corners thereof with suitable projections or hooks 10ⁿ, whereby the device may be caused to engage positively with an endless chain or conveyor, as illustrated at Fig. 5.

The device is intended for use more particularly in the production of molded frozen confections in which the molded and solidified product has embedded therein the lower end of a wooden stem or stick whose upper projecting end serves as a handle for holding the product while the same is being eaten.

The operation of the device will be largely obvious. It is to be noted, however, that in practice the sticks or stems 20 are preferably first inserted into the apertures 18 in the cover plate 14 and held in position by the spring fingers 19, 19, whereupon the cover plate 14 is disposed upon and engaged by the frame 10 between the pins or stops 16. When the cover plate 14 is properly in position the lower portion of each stick or stem 20 will extend centrally into its respective mold or container 12, and may then be forced down by hand into the liquid composition to the desired extent. Hereupon the device 10 with the molds or containers 12, is introduced into a receptacle 22 containing a freezing liquid or agent, and preferably carried through the same upon an endless conveyor or belt 23, as illustrated at Fig. 5, and the contents of each mold with its stem 20, frozen to the desired degree. Hereupon, the device is removed from the bath and the cover plate 14 detached. In detaching the cover plate 14 from its support 10 the spring fingers 19, 19 will, owing to their yielding engagement, release their respective stems 20, which are now firmly embedded in the frozen or solidified composition 21 in the mold. The molds are then removed from the frame, and the contents thereof withdrawn by the sticks.

It will, of course, be obvious that the molds need not be made of glass and of cylindrical form, as the same may be made of any suitable material, and of any desired shape or form capable of being readily inserted into and removed from the holder or support.

Having thus described my said invention, what I claim and desire to secure by Letters Patent is:

1. A device of the character described comprising a support having openings therein to retain molds for producing a confection or the like having an embedded stem, a cover plate having openings therein registering with the openings in said support, means for positioning said cover plate upon said support, and separate means on said cover plate adjacent to each opening therein for releasably supporting within each opening a stem in position to be embedded in the contents of its respective molds, substantially as specified.

2. A device of the character specified comprising a support having openings therethrough each adapted to retain a mold for producing a confection or the like having an embedded stem, a plate disposed upon the upper side of said support and provided with openings registering with the openings in said support, and means associated with the openings in said plate for supporting stems in position to be embedded severally in the contents of said molds, substantially as specified.

3. A device of the character specified comprising a support having openings therein to retain molds for producing a confection or the like having an embedded stem, a member adapted to engage with said support, said member having openings therein registering with the openings in said support, interengaging portions on said member and said support for maintaining said member against longitudinal and trasverse movement upon said support, and separate means arranged on said member at each opening therein for releasably supporting stems in position to be embedded severally in the contents of said molds, substantially as specified.

4. A device of the character specified comprising a support having openings therein to retain molds for producing a confection or the like having an embedded stem, a member adapted to engage with said support and having openings therein registering with the openings in said support, and separate spring holding means on said member arranged at each of the openings therein, adapted to engage and hold a stem in position to be embedded in the contents of its respective mold, substantially as specified.

5. A device of the character specified comprising a support having openings therein to retain molds for producing a confection or the like having an embedded stem, a member adapted to engage with said support and having openings therein registering with the openings in said support, and spring members extending from the underside of said member at each opening therein for releasably holding a stem in position to be embedded in the contents of its respective mold, substantially as specified.

6. A device of the character specified comprising a support having openings therein to retain molds for producing a confection or the like having an embedded stem, a cover plate having openings therein registering with the openings in said support, flanges at opposite edges of said member adapted to engage with the corresponding sides of said support, and spring means on the underside of said cover plate adjacent to each opening therein for releasably supporting within each opening a stem in position to be embedded in the contents of its respective mold, substantially as specified.

7. A device of the character specified comprising a support having openings therein to receive and retain molds for producing a confection or the like having an embedded stem, a cover plate having openings therein registering with the openings in said support, means on said support for maintaining said cover plate against longitudinal movement, means for maintaining said cover plate against transverse movement upon said support, and spring means arranged upon the under side of said cover plate at each opening therein to hold a stem in position within the corresponding molds so as to be embedded in the contents of its respective mold, substantially as specified.

8. A device of the character specified comprising a support having openings therein to receive and retain molds for producing a confection or the like having an embedded stem, a cover plate having openings therein registering with the openings in said support, means on said support for maintaining said cover plate against longitudinal movement upon said support, flanges at the opposite sides of said cover plate adapted to engage with the corresponding sides of said support for maintaining said cover plate against transverse movement upon said support, and a pair of spring members arranged upon the under side of said cover plate at each opening therein to hold a stem in position within the corresponding mold so as to be embedded in the contents of its respective mold, substantially as specified.

Signed at the city of New York, in the county and State of New York, this fifteenth day of April, one thousand nine hundred and twenty-four.

MILTON SCHNAIER.